United States Patent [19]

Lyndhurst

[11] Patent Number: 5,411,133
[45] Date of Patent: May 2, 1995

[54] NEWSPRINT CONVEYOR LINK ASSEMBLY

[76] Inventor: Richard Lyndhurst, 2885 Miguel La., Costa Mesa, Calif. 92626

[21] Appl. No.: 192,380

[22] Filed: Feb. 7, 1994

[51] Int. Cl.⁶ .......................................... B65G 39/20
[52] U.S. Cl. .................................. 198/845; 198/685
[58] Field of Search ............... 198/803.7, 803.9, 838, 198/845, 852, 683, 685; 271/204–206, 277

[56] References Cited

U.S. PATENT DOCUMENTS

| | | | |
|---|---|---|---|
| 4,294,345 | 10/1981 | Stauber et al. | 198/685 |
| 5,129,506 | 7/1992 | Gutov et al. | 198/845 |

*Primary Examiner*—Joseph E. Valenza
*Attorney, Agent, or Firm*—William W. Haefliger

[57] ABSTRACT

A newsprint conveyor assembly comprising a carrier for a transverse rod that transports newsprint; a support for the carrier, including two branches including two primary plate portions that are relatively long and extend endwise longitudinally in parallel relation and are transversely spaced apart, and two secondary plate portions that are relatively short and extend endwise longitudinally in parallel, side-by-side relation, each branch including a relatively sharp bend portion interconnecting one of the relatively long plate portions with one of the relatively short plate portions, and there being connector structure interconnecting the branches at the relatively short plate portions; the primary plate portions defining primary bearing openings and the secondary plates defining secondary bearing openings; the carrier having a base positioned between the relatively long plate portions and endwise between the relatively sharp bend portions and the primary bearing openings; and at least three endwise spaced rivets connecting the carrier base to the primary plate portions.

11 Claims, 6 Drawing Sheets

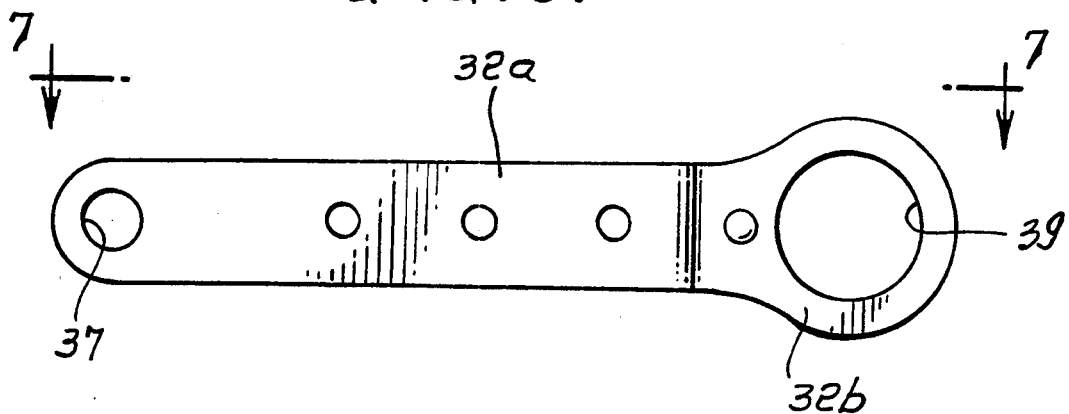
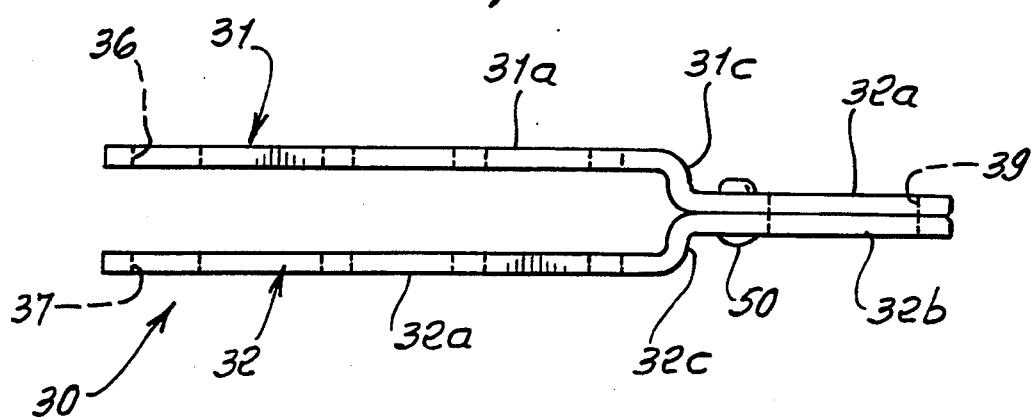

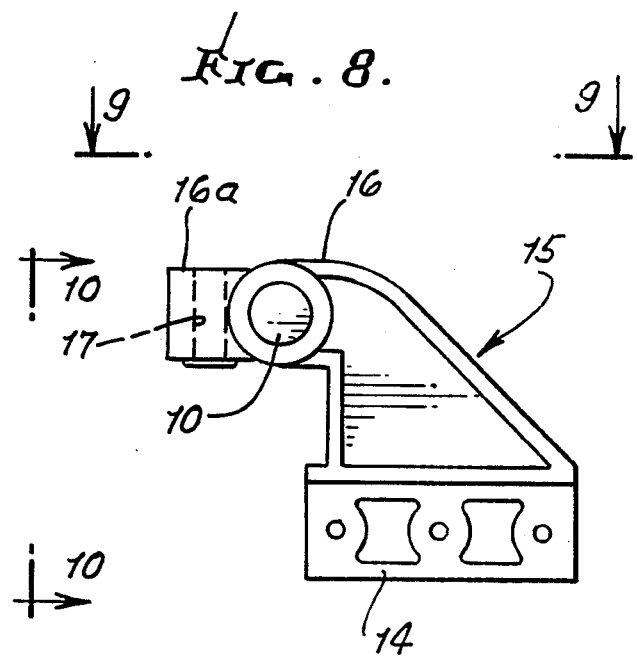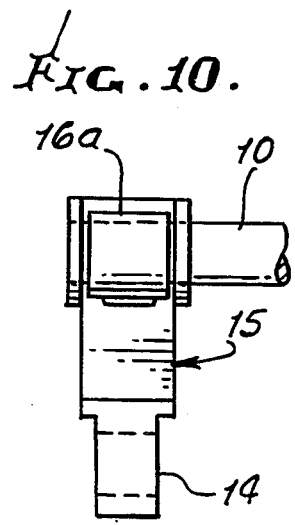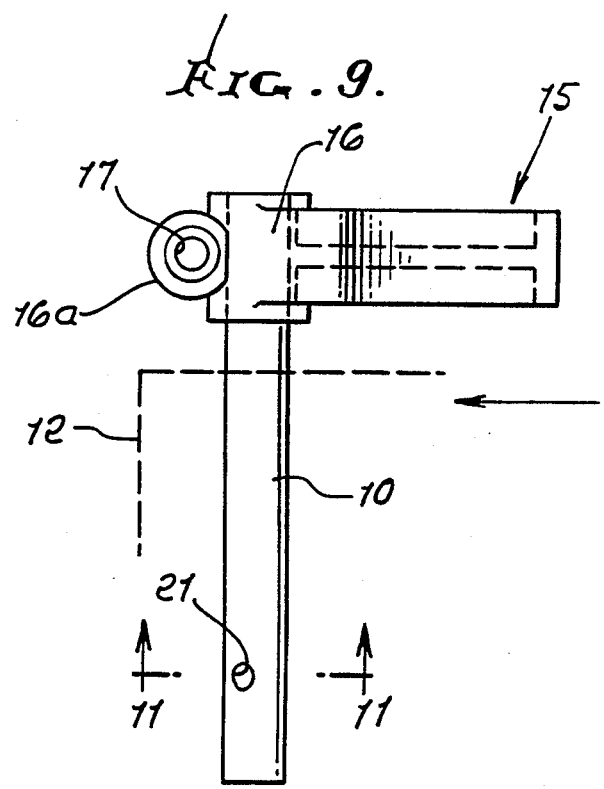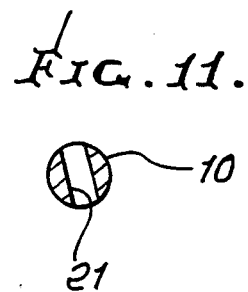

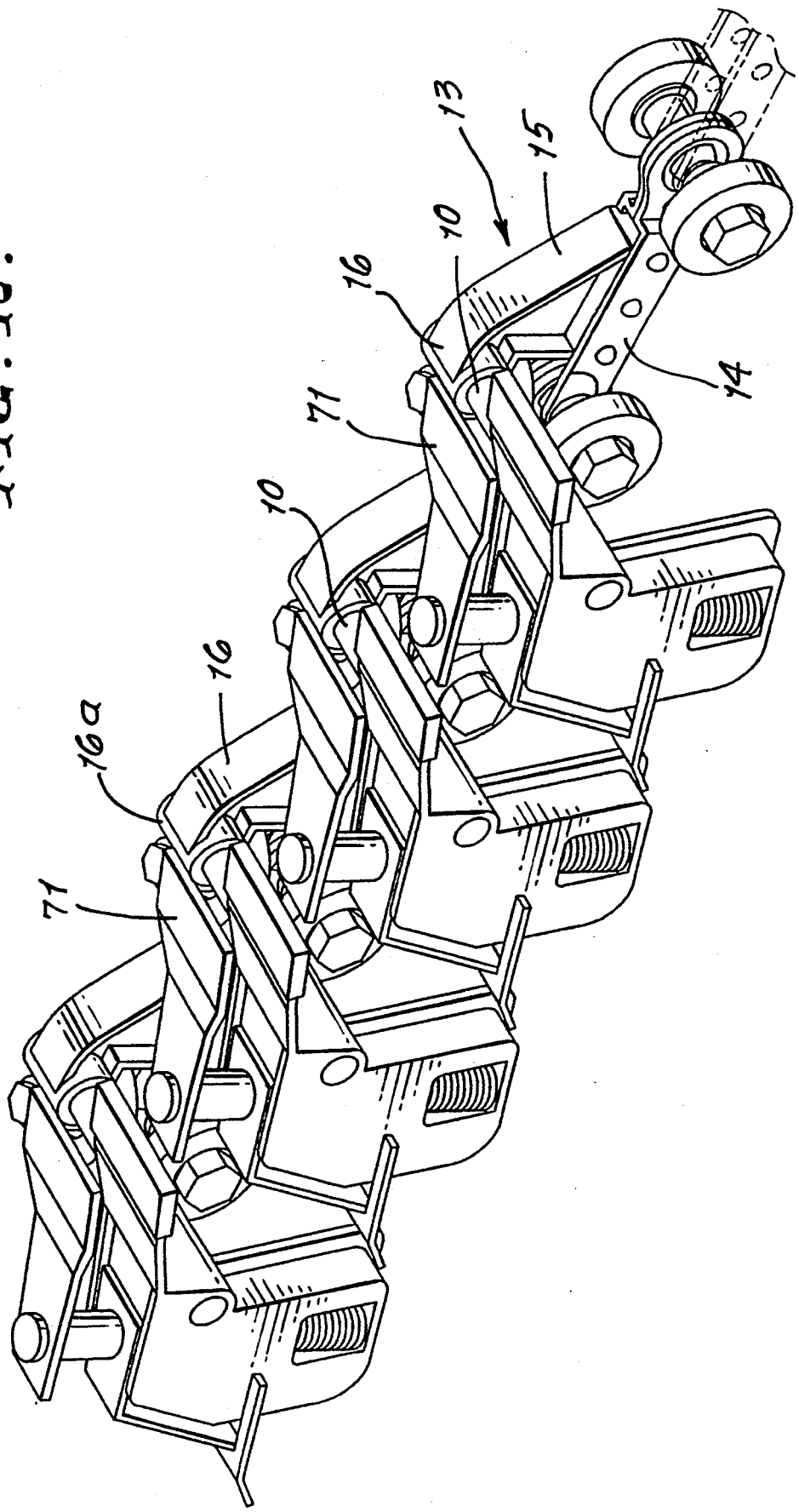

NEWSPRINT CONVEYOR LINK ASSEMBLY

BACKGROUND OF THE INVENTION

This invention relates generally to newsprint conveyors, and more particularly to improvements in linkage mechanisms employed in conveyors for newspapers, as during the printing process.

Such conveyors utilize successive transverse bars attached to secondary mechanism, to rapidly convey the papers along the conveyor path of travel. Opposite ends of those bars are typically attached to carriers that extend to the bar end locations from linkage elements in a row or series, and are pivotally interconnected. Each carrier is attached to a support by two closely spaced rivets. Over time, it is found that those rivets tend to loosen, due to metal fatigue resulting from rapid and frequent shear loading applications from newspapers, and from linkage travel over rollers and around bends along the conveyor path. Such rivet loosening can result in system failure and/or expensive shutdown, for repair of many and different linkage elements in the conveyor chain. There is need for method and means to alleviate these particular problems.

SUMMARY OF THE INVENTION

It is a major object of the present invention to provide such needed method and means. Basically, the improved newsprint, i.e., newspaper conveyor linkage assembly comprises:

a) a carrier for a transverse rod that transports newsprint, b) a support for the carrier, including two branches including two primary plate portions that are relatively long and extend endwise longitudinally in parallel relation and are transversely spaced apart, and two secondary plate portions that are relatively short and extend endwise longitudinally in parallel, side-by-side relation, each branch including a relatively sharp bend portion interconnecting one of the relatively long plate portions with one of the relatively short plate portions, and connector means interconnecting the branches at the relatively short plate portions, c) the primary plate portions defining primary bearing openings and the secondary plates defining secondary bearing openings, d) the carrier having a base positioned between the relatively long plate portions and endwise between the relatively sharp bend portions and the primary bearing openings, e) and at least three endwise spaced rivets connecting the carrier base to the primary plate portions.

As will be seen, the relatively sharp bend portions of the branch plates are relatively located between the secondary bearing pin openings and a midpoint between the primary and secondary pin openings. Further, those relatively sharp bend portions typically extend toward one another, substantially normal to planes defined by the relatively long plate portions. Accordingly, the lengths of the two primary plate portions are maximized to allow for reception therebetween of a carrier base of lengthened dimension allowing lengthwise positioning or interfitting with the plates of spaced rivets, spaced and configured to increase the rivet and rivet connection fatigue life, leading to extended life between failures, and far fewer potential shutdowns of the system.

Another object is the provision of a configuration wherein the primary plate bearing openings define a first transverse axis, the secondary plate openings define a second transverse axis, and the rivets define third, fourth and fifth transverse axes; and the third and fifth axes have spacing therebetween which exceeds spacing between the first and second axes. Typically, the spacing between the third and fifth axes exceeds the spacing between the fifth and second axis. Also, the five axes typically define a common plane of load transfer, contributing to extended life.

Yet another object is to provide ball bearing races connected to the plate portion at the primary and secondary bearing pin openings, those races located near the relatively sharp bend portions of the plates; and to provide ball bearings confined by the races, and shafts carried by the ball bearings and extending transversely through the bearing pin openings for supporting guide rollers.

These and other objects and advantages of the invention, as well as the details of an illustrative embodiment, will be more fully understood from the following specification and drawings, in which:

DRAWING DESCRIPTION

FIG. 6 is a side elevation showing support branches;

FIG. 7 is a top plan view taken on lines 7—7 of FIG. 6;

FIG. 8 is a side elevation showing the newsprint carrier rod, and carrier;

FIG. 9 is a top plan view taken on lines 9—9 of FIG. 8;

FIG. 10 is an end elevation taken on lines 10—10 of FIG. 8; and

FIG. 11 is a section taken on lines 11—11 of FIG. 9; and

FIG. 12 is a perspective view, with secondary mechanism in place.

DETAILED DESCRIPTION

Figure 1:
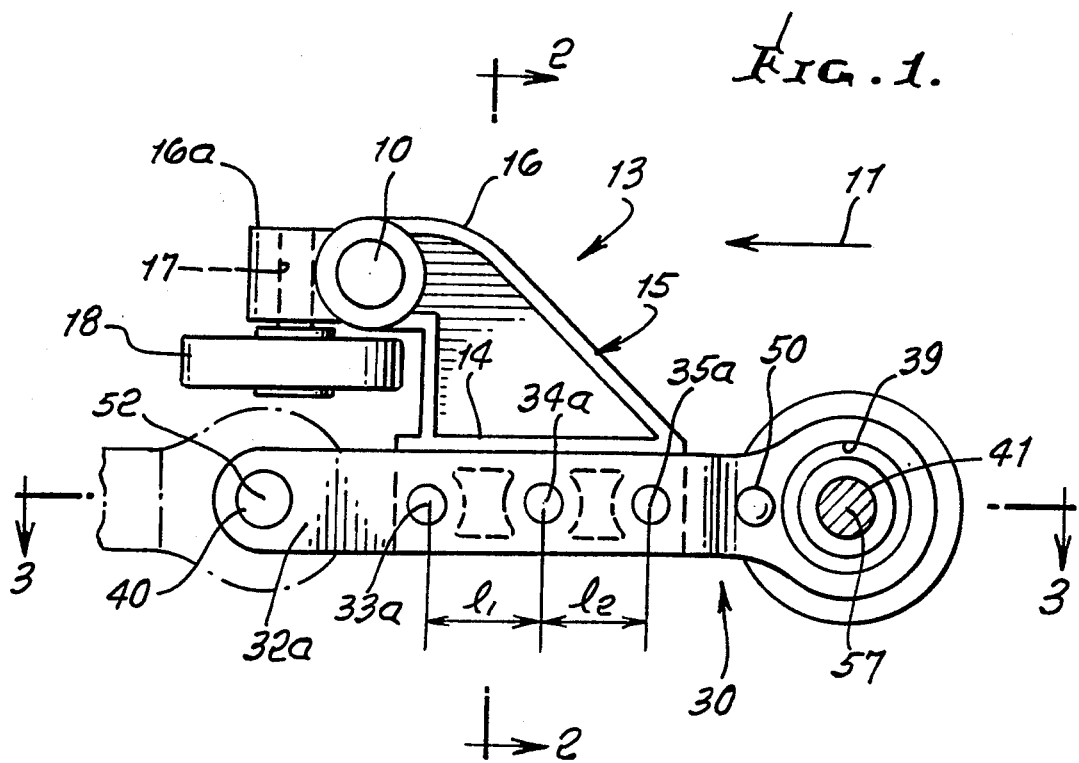
FIG. 1 is a side elevation showing a support for a newsprint carrier rod and carrier.
Figure 2:
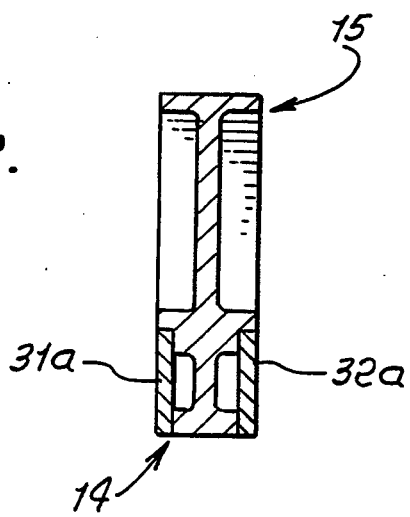
FIG. 2 is an end elevation taken on lines 2—2 of FIG. 1.

In the drawings, a newsprint carrier rod 10 extends transversely to engage and transport newsprint, such as a folded newspaper, in a longitudinal conveyed direction 11. See broken lines 12 indicating the paper in FIG. 9. The rod 10 has its end attached to frame 15. See FIG. 12.

Carrier 13 includes a longitudinally elongated base 14, and the upwardly extending frame 15 integral with the top of the base. The frame also has a gooseneck 16 offset or projecting endwise above and beyond the base, to carry the rod. Neck 16 has a terminal portion 16a that forms a vertical opening 17 to receive the vertical shaft of a guide roller 18. Roller is guided between edges 19 and 20 of a track 90 seen in FIG. 4. Rod 10 may be tubular and have side openings 21, seen in FIG. 11, for better accommodation to the newsprint.

The carrier base 14 is carried by a support 30, which has two branches 31 and 32. The latter typically include two primary, parallel, branch plate portions 31a and 32a that are relatively long and extend endwise longitudinally while being transversely spaced or offset. Base 14 fits closely between plate portions 31a and 32a; and at least two, and preferably three, endwise spaced rivets 33-35 interconnect the base to the plate portions 31a and 32a, as shown. Thus, loading is transferred between the plates and the base at well distributed locations; and wear between the rivets, base portion and plate portion is substantially reduced relative to wear encountered where only two closely spaced rivets are employed, as in the past. Reduced wear and enhanced stability result in reduced down-time for parts replacement and substantial cost savings.

Note that the spacing $l_1$ between axes 33a and 34a of rivets 33 and 34 is at least 15 mm; and the spacing $l_2$ between axes 34a and 35a of rivets 34 and 35 is at least 15 mm. Normally, $l_1$ will equal $l_2$. If rivet 34 is eliminated, the spacing between rivets 33 and 35 may be as shown and described, i.e., well in excess of 15 mm.

The above construction is facilitated by providing two secondary branch plate portions 31b and 32b that are relatively short and extend endwise longitudinally in parallel, side-by-side relation. Each branch also includes relatively sharp bend portions 31c and 32c, bend portion 31c interconnecting or being integral with plate positions 31a and 31b, and bend portion 32c interconnecting or being integral with plate portions 32a and 32b. Bend portions 31c and 32c extend toward one another, substantially normal to the parallel planes defined by the longer plate portions 31a and 32a. One end of elongated base 14 fits close to the bend portions, as shown. Bend portions extend at about 90° to the planes defined by 31a and 32a.

The primary plate portions 31a and 32a define primary bearing openings 36 and 37; and the secondary plate portions define secondary bearing openings 38 and 39; and bearing pins 40 and 41 extend through those openings, as shown. Openings 38 and 39 are larger than openings 36 and 37.

Figure 4:
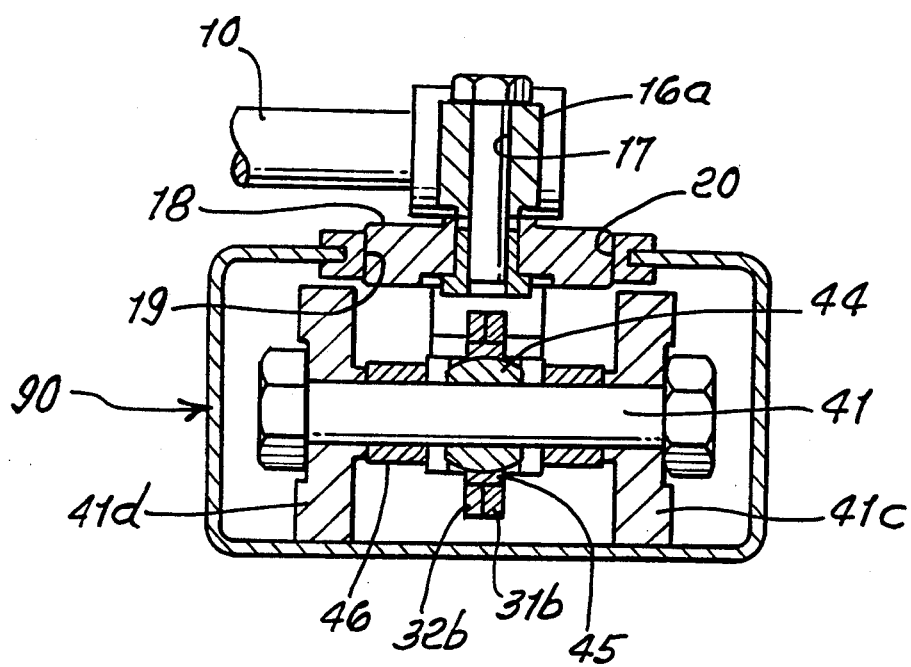
FIG. 4 is a cross section taken in elevation showing guided travel of the support, in a newsprint conveyor system.

Pin 41 carries guide wheels 41c and 41d, at opposite sides of the conveyor. Such wheels guide in the track, as shown in FIG. 4. A bearing ball and socket are shown at 44 and 45, these fitting between plate portions 31a and 32a, as shown. Supports or spacers 46 extend, as shown. The socket 45 is carried by the plate portions 31b and 32b, as shown. A rivet 50 interconnects those plate portions in side-by-side relation, between bend portions 31c and 32c, and the socket. The socket defines a race within which the ball pivots.

Figure 3:
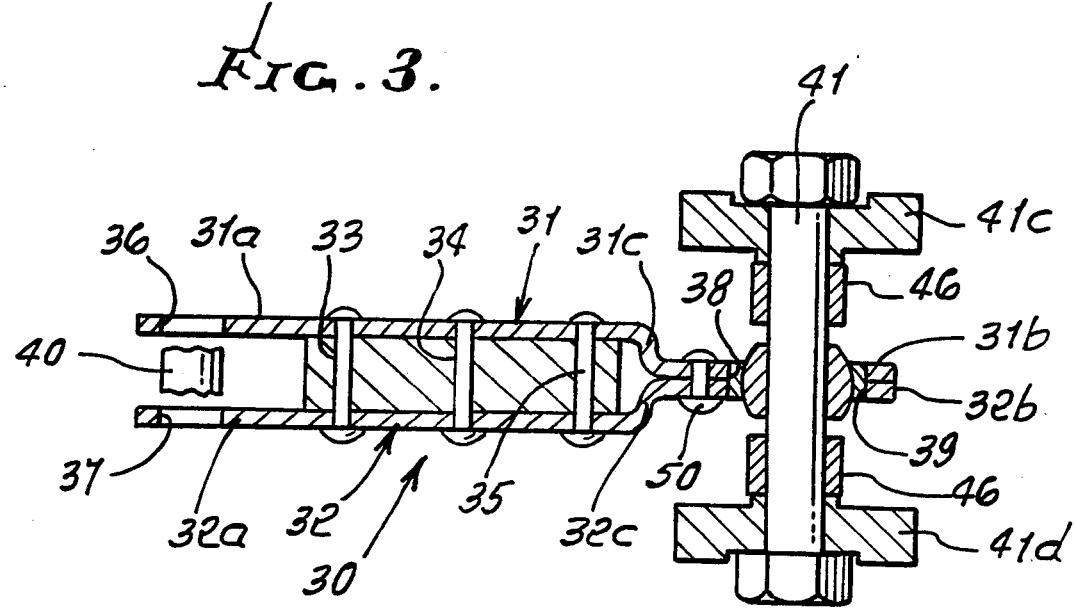
FIG. 3 is a horizontal section taken on lines 3—3 of FIG. 1.

Referring to FIGS. 1 and 3, the openings 36 and 37 define a first transverse axis 52; the openings 38 and 39 define a second transverse axis 57; and the rivets define third, fourth and fifth transverse axes 33a, 34a, and 35a. The spacing between the third and fifth axes 33a and 35a exceeds the spacing between the fifth and second axes 35a and 57; and the spacing between axes 33a and 35a exceeds the spacing between axes 52 and 33a. The five axes define a common load transfer plane.

Figure 5:
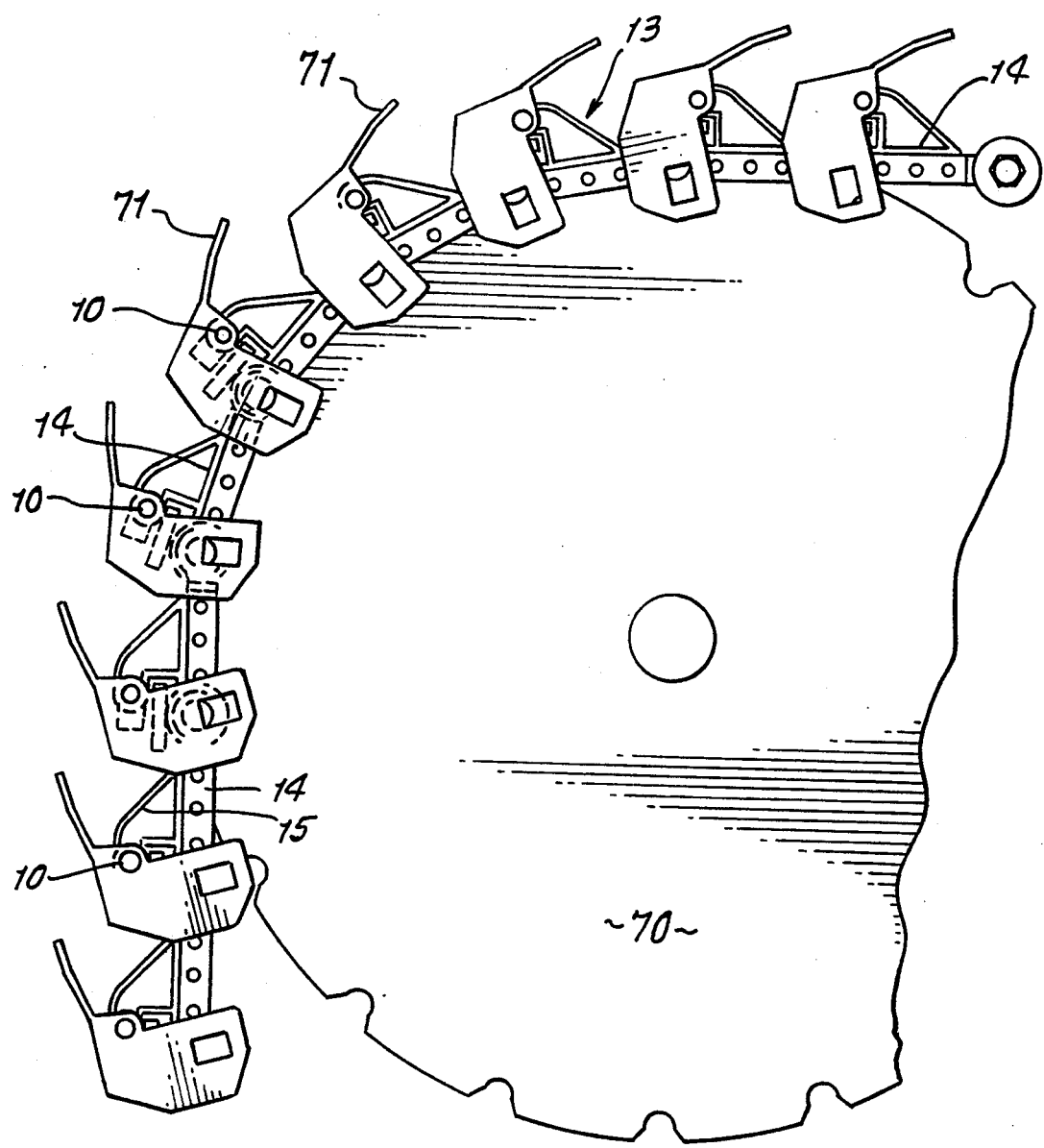
FIG. 5 is a schematic elevation showing travel of the conveyor about a sprocket or drum.

FIG. 5 shows carrier rods 10 and frames 14 being elevated by a drive wheel 70. Newspaper holders appear at 71.

FIG. 12 shows carrier structure in greater detail.

I claim:

1. In a newsprint conveyor assembly, the combination comprising:
   a) a carrier for a transverse rod that transports newsprint,
   b) a support for the carrier, including two branches including two primary plate portions that are relatively long and extend endwise longitudinally in parallel relation and are transversely spaced apart, and two secondary plate portions that are relatively short and extend endwise longitudinally in parallel, side-by-side relation, each branch including a relatively sharp bend portion interconnecting one of said relatively long plate portions with one of said relatively short plate portions, said sharp bend portion having an intermediate section which is substantially perpendicular to planes defined by the primary and secondary plate portions, and there being connector means interconnecting said branches at said relatively short plate portions,
   c) said primary plate portions defining primary bearing openings and said secondary plates defining secondary bearing openings,
   d) said carrier having a base positioned between said relatively long plate portions and endwise between said relatively sharp bend portions and said primary bearing openings,
   e) and at least three endwise spaced rivets connecting said carrier base to said primary plate portions, said base having the same width at each rivet location and said rivets passing widthwise through the base,
   f) one of said rivets and an end portion of said base extending in proximity to said sharp bend portions of said branches,
   g) the spacing of said base from said bend portion intermediate sections being less that the width of said base at said one rivet location.

2. The combination of claim 1 wherein said relatively sharp bend portions are entirely located between said secondary bearing pin openings and a midpoint between said primary and secondary pin openings.

3. The combination of claim 1 wherein said relatively sharp bend portions extend toward one another, substantially normal to planes defined by said relatively long plate portions.

4. The combination of claim 2 wherein said relatively sharp bend portions extend toward one another, substantially normal to planes defined by said relatively long plate portions.

5. The combination of claim 1 wherein said primary plate bearing openings define a first transverse axis, said secondary plate openings define a second transverse axis, said rivets define third, fourth and fifth transverse axes, and said third and fifth axes have spacing therebetween which exceeds spacing between said first and second axes.

6. The combination of claim 5 wherein said spacing between said third and fifth axes exceeds the spacing between said fifth and second axis.

7. The combination of claim 5 wherein said first through fifth axes defines a common plane.

8. The combination of claim 1 including ball bearing races connected to said plate portion at said primary and secondary bearing pin openings, those races located near said relatively sharp bend portion of the plates.

9. The combination of claim 8 including ball bearings confined by said races, and shafts carried by the ball bearings and extending transversely through said bearing pin openings for supporting guide rollers.

10. The combination of claim 5 wherein the third and fourth axes have spacing therebetween of at least about 15 mm, whereby stability of the connection of the carrier base to the plate portion is enclosed.

11. The combination of claim 10 wherein the fourth and fifth axes have spacing therebetween of at least about 15 mm, whereby stability of the connection of the carrier base to the plate portion is enhanced.

* * * * *